(No Model.)
T. E. GREGG.
CAR FENDER.
No. 575,396. Patented Jan. 19, 1897.
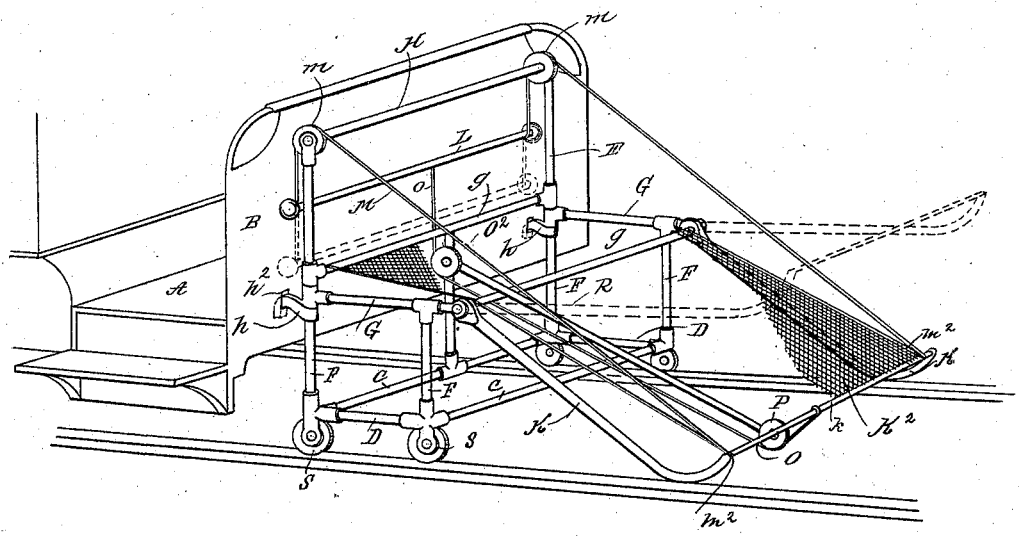
WITNESS:
C. Vordfor
C. Gerst
INVENTOR
Thomas E. Gregg,
BY
Edgar Tate & Co
ATTORNEYS.

UNITED STATES PATENT OFFICE.

THOMAS EDWARD GREGG, OF MARLBOROUGH, NEW YORK.

CAR-FENDER.

SPECIFICATION forming part of Letters Patent No. 575,396, dated January 19, 1897.

Application filed December 31, 1895. Serial No. 573,886. (No model.)

*To all whom it may concern:*

Be it known that I, THOMAS EDWARD GREGG, a citizen of the United States, and a resident of Marlborough, in the county of Ulster and State of New York, have invented certain new and useful Improvements in Car Fenders or Guards, of which the following is a specification, reference being had to the accompanying drawing, forming a part thereof, in which similar letters of reference indicate corresponding parts.

This invention relates to guards or fenders for cars; and the object thereof is to provide an effective device of this class which may readily be connected with the end of a car and detachable therefrom, and which may be moved from one end of the car to the other, and which is designed to prevent the serious and sometimes fatal results which follow the striking of a person or object by a car while in motion.

The invention is fully disclosed in the following specification, of which the accompanying drawing forms a part, said drawing being a perspective view of the end of a car provided with my improved fender or guard.

In the drawing forming part of this specification, A represents the platform of a car, and B the dashboard thereof; and in the practice of my invention I provide a fender or guard consisting of two frames, the main frame being composed of a rectangular oblong frame comprising transverse rods C and end rods D, which form the bottom thereof, vertical corner-rods E and F, and cross-rods G at the top of the rods F, and transverse rods $g$, which form the body portion of the main frame, and the vertical rods E being extended or carried upwardly, so as to form a back, the upper ends of said vertical rods being united by a transverse rod H. This frame is connected with the dashboard of the car by means of hooks $h$, which are connected with the vertical rods E and adapted to be passed through holes or openings $h^2$ in the dashboard, or any preferred means may be employed for making this connection.

Pivotally connected with the upper forward transverse rod $g$ is a supplemental frame, which consists of side bars K and a transverse forward end bar $k$, by which the forward ends of said bars are connected, and the supplemental frame is provided with a covering or body portion $k^2$, of wire-mesh or similar material, only a portion of which is shown, and which in practice is extended backwardly over the forward transverse rod $g$ to and connected with the rear transverse rod $g$. I also provide a weighted operating-rod L, with the ends of which are connected cords or chains M, which are passed over the rollers $m$ at the ends of the transverse rod H, and which are carried forward and connected with the forward end of the supplemental frame, as shown at $m^2$, and secured to the middle portion of the operating-rod L is a cord O, which is passed beneath a pulley $O^2$, which is mounted on the rear end of a bar R, near the rear transverse rod $g$, and the cord O is carried forward and passed beneath the pulley P, mounted on the forward end of the bar R, the inner end of which is pivotally connected with the vertical central rod of the main frame, and the cord O is then connected with the forward portion of the supplemental frame, said rod R being designed to afford additional strength to the frame and to take up the slack in the cord O and facilitate the operation of raising or lowering the supplemental frame, and the operation will be readily understood from the foregoing description, when taken in connection with the accompanying drawing.

When the car is in motion, the normal position of the fender or guard or of the separate parts thereof is shown in full lines in the drawing, in which the supplemental frame projects forward and adjacent to the track, and if a person or object should be struck thereby, said person or object would be received upon the body portion $k$, of wire-netting or similar material, and the passage of such person or object beneath the car would be prevented.

The supplemental frame may be raised into the position shown in dotted lines by depressing the rod L, and again lowered into the position shown in full lines by raising said rod, as hereinbefore stated. The entire fender or guard may be detached from one end of the car and connected with the other whenever desired.

It will also be seen that the main frame of the fender or guard is supported by rollers S, which are adapted to rest upon the rails of the track, and my invention is not limited to the exact form, combination, and arrangement of the various parts thereof herein described, nor to the method of connecting the various parts of the separate frames which constitute the fender or guard; and I therefore reserve the right to make all such alterations therein and modifications thereof as fairly come within the scope of the invention.

Having fully described my invention, I claim as new and desire to secure by Letters Patent—

1. A fender or guard for a tramway-car comprising a main frame which is adapted to be detachably connected with the end of a car, and to be supported adjacent to, or upon the rails of the track, a supplemental frame pivotally connected with the upper portion of the main frame, and adapted to be projected in front thereof, so that the forward end thereof will rest upon, or adjacent to the rails of the track said main frame being also provided with an upwardly-extended back, and an operating-rod adjacent to said back, each end of which is provided with a cord or chain which extends over pulleys connected with the upwardly-extended back of the main frame, and the opposite ends of which are connected with the forward part of the supplemental frame, and said operating-rod being also provided centrally with another cord or chain which extends beneath a pulley mounted on the rear end of a bar pivoted to the back of the main frame, and beneath another pulley mounted at the forward end of said bar which extends forward of the main frame said cord or chain being then secured to the forward part of the supplemental frame, substantially as shown and described.

2. A fender or guard for a tramway-car comprising a main frame which is adapted to be detachably connected with the end of a car, and to be supported adjacent to, or upon the rails of the track, a supplemental frame pivotally connected with the upper portion of the main frame, and adapted to be projected in front thereof, so that the forward end thereof will rest upon, or adjacent to the rails of the track, said main frame being also provided with an upwardly-extended back, and an operating-rod adjacent to said back, each end of which is provided with a cord or chain which extends over pulleys connected with the upwardly-extended back of the main frame, and the opposite ends of which are connected with the forward part of the supplemental frame, and said operating-rod being also provided centrally with another cord or chain which extends beneath a pulley mounted on the rear end of a bar pivotally connected to the back of the main frame, and beneath another pulley mounted at the end of said bar which extends forward of the main frame, said cord or chain being then secured to the forward part of the supplemental frame, and said main frame being provided with wheels or rollers at each side thereof which are adapted to rest upon the rails of the track, substantially as shown and described.

In testimony that I claim the foregoing as my invention I have signed my name, in presence of the subscribing witnesses, this 10th day of December, 1895.

THOMAS EDWARD GREGG.

Witnesses:
JOSEPH M. ENTZ,
WILLIAM J. CURRAN.